United States Patent
Sonoki

(10) Patent No.: US 10,994,714 B2
(45) Date of Patent: May 4, 2021

(54) VEHICLE BRAKE HYDRAULIC CONTROL DEVICE

(71) Applicant: NISSIN KOGYO CO., LTD., Tomi (JP)

(72) Inventor: Taro Sonoki, Tomi (JP)

(73) Assignee: NISSIN KOGYO CO., LTD., Nagano (JP)

( * ) Notice: Subject to any disclaimer, the term of this patent is extended or adjusted under 35 U.S.C. 154(b) by 4 days.

(21) Appl. No.: 16/082,831

(22) PCT Filed: Feb. 28, 2017

(86) PCT No.: PCT/JP2017/007927
§ 371 (c)(1),
(2) Date: Sep. 6, 2018

(87) PCT Pub. No.: WO2017/169476
PCT Pub. Date: Oct. 5, 2017

(65) Prior Publication Data
US 2019/0100176 A1    Apr. 4, 2019

(30) Foreign Application Priority Data
Mar. 31, 2016 (JP) .............................. JP2016-073555

(51) Int. Cl.
*B60T 8/1761* (2006.01)
*B60T 8/1763* (2006.01)
(Continued)

(52) U.S. Cl.
CPC ............ *B60T 8/1763* (2013.01); *B60T 8/176* (2013.01); *B60T 8/1761* (2013.01); *B60T 8/344* (2013.01);
(Continued)

(58) Field of Classification Search
CPC ... B60T 8/34; B60T 8/48; B60T 8/176; B60T 8/1763; B60T 8/1761; B60T 8/4827; B60T 8/5006
See application file for complete search history.

(56) References Cited

U.S. PATENT DOCUMENTS 4,660,896 A * 4/1987 Matsuda ............. B60T 8/17616
303/156
5,368,373 A * 11/1994 Braschel ............... B60T 8/1764
303/156
(Continued)

FOREIGN PATENT DOCUMENTS

JP    10-016747        1/1998
JP    10-278765 A     10/1998
(Continued)

OTHER PUBLICATIONS

Japanese Office Action with partial English translation dated Jun. 4, 2019, 6 pages.
(Continued)

*Primary Examiner* — Thomas J Williams
(74) *Attorney, Agent, or Firm* — Rankin, Hill & Clark LLP

(57) ABSTRACT

A brake fluid pressure control device for a vehicle that includes a wheel speed obtaining device to obtain wheel speed, and a vehicle body deceleration calculating means to calculate a vehicle body deceleration on the basis of the wheel speed. If a condition is satisfied in which the vehicle body deceleration continues to stay at a low rate of less than or equal to a predetermined threshold value for a predetermined period of time, the pressure increasing rate in pressure increasing control is altered to a higher value than before the condition is satisfied. The brake fluid pressure of a brake caliper can quickly be brought close to the fluid pressure of a master cylinder. Therefore, it is possible to improve the (Continued)

brake responsiveness when the brake is re-operated by the driver during the ABS control, thereby reducing the driver's feeling of wrongness and strangeness.

4 Claims, 5 Drawing Sheets

(51) Int. Cl.
    *B60T 8/34*     (2006.01)
    *B60T 8/48*     (2006.01)
    *B60T 8/176*     (2006.01)
    *B60T 8/50*     (2006.01)
    *B60T 8/172*     (2006.01)

(52) U.S. Cl.
    CPC .............. *B60T 8/48* (2013.01); *B60T 8/4827* (2013.01); *B60T 8/5006* (2013.01); *B60T 8/172* (2013.01); *B60T 2210/12* (2013.01)

(56) References Cited

U.S. PATENT DOCUMENTS 6,019,438 A * 2/2000 Sawada .................. B60T 7/042
    303/113.4
6,045,198 A * 4/2000 Naito .................. B60T 8/17636
    303/149
2007/0029875 A1* 2/2007 Kurosaki .............. B60T 8/1764
    303/187
2015/0183411 A1* 7/2015 Sakurazawa .......... B60T 8/4081
    701/70

FOREIGN PATENT DOCUMENTS

| | | |
|---|---|---|
| JP | 110-278765 | 10/1998 |
| JP | H10-278765 | 10/1998 |
| JP | 111-34844 | 2/1999 |
| JP | 11-208434 A | 8/1999 |
| JP | 111-208434 | 8/1999 |
| JP | I11-208434 | 8/1999 |
| JP | 2007-022404 | 2/2007 |

OTHER PUBLICATIONS

Australian First Examination Report dated Jan. 7, 2019, 3 pages.
International Search Report, dated May 30, 2017 (dated May 30, 2017), 2 pages.

* cited by examiner

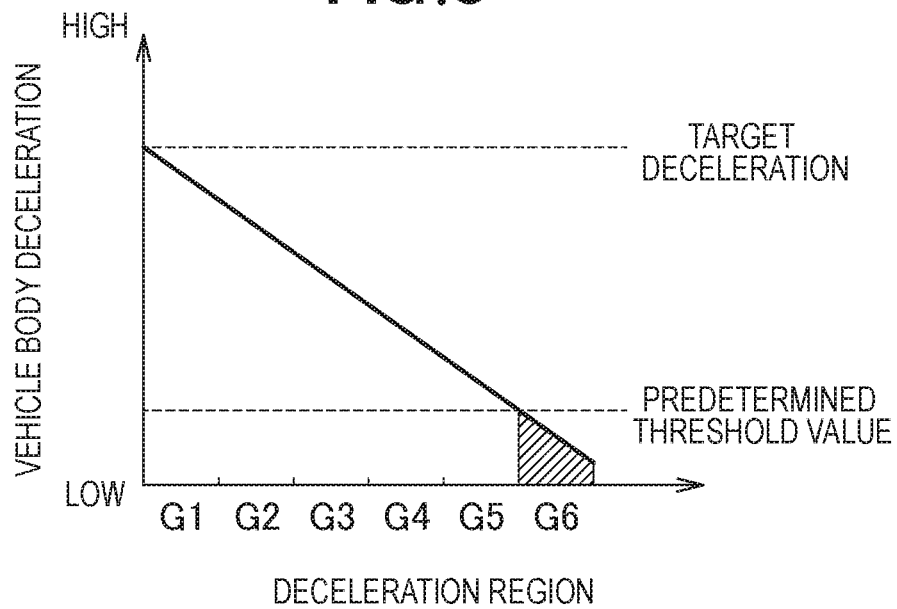

VEHICLE BRAKE HYDRAULIC CONTROL DEVICE

TECHNICAL FIELD

The present invention relates to a brake fluid pressure control device for a vehicle to make a determination of increasing an amount (rate) of pressure increase under a certain condition.

BACKGROUND ART

An antilock braking system (ABS) is a device to avoid locking of wheels. For example, a technique for avoiding deterioration of brake responsiveness of a motorcycle when a brake activating part (brake operation part) is once released by a driver during ABS control and re-operated is known in, for example, Patent Literature Document 1.

In the technique of Patent Literature Document 1, the ABS control is terminated under a certain condition to avoid the deterioration of brake responsiveness when the brake operation part is re-operated.

In the meantime, if a brake fluid pressure control device for a vehicle does not have a unit for detecting brake operation, such as a pressure sensor or a brake lamp switch, the ABS control may continue even if an input to the brake operation part is terminated. Thus, when a driver re-operates the brake operation part during the ABS control, the drive may have a feeling of wrongness and/or strangeness upon re-operating the brake operation part if there is a difference between an originally designed amount (rate) of pressure increase of a master cylinder and a rate of pressure increase of the ABS control.

LISTING OF REFERENCES

Patent Literature Documents

Patent Literature Document 1: Japanese Patent Application Laid-Open Publication No. Hei 10-16747

SUMMARY OF THE INVENTION

Problems to be Solved by the Invention

An object of the present invention is to provide a brake fluid pressure control device for a vehicle that at least minimizes a driver's feeling of wrongness and strangeness when the driver re-operates the brake during the ABS control.

Solution to Overcome the Problems

The present invention is directed to a brake fluid pressure control device for a vehicle, configured to be able to perform fluid pressure control for controlling brake fluid pressure acting on a wheel brake. The brake fluid pressure control device includes a wheel speed obtaining device configured to obtain wheel speed, and a vehicle body deceleration calculating means configured to calculate a vehicle body deceleration based on the wheel speed. If a condition is satisfied in which the vehicle body deceleration continues to stay at a low rate of less than or equal to a predetermined threshold value for a predetermined period of time, the pressure increasing rate in pressure increasing control is altered to a higher value than before the condition is satisfied.

The present invention is further directed to the brake fluid pressure control device for a vehicle as described hereinbefore, wherein the pressure increasing control is control that repeats increasing and holding of the brake fluid pressure, and the pressure increasing control increases an amount of pressure increase of the brake fluid pressure by increasing time for opening an inlet control valve disposed between a master cylinder and the wheel brake, and alters the pressure increasing rate to the higher value by reducing holding time for holding the brake fluid pressure.

The present invention is also directed to the brake fluid pressure control device for a vehicle as described hereinbefore, wherein the predetermined threshold value is set based on a target vehicle body deceleration.

The present invention is still further directed to the brake fluid pressure control device for a vehicle as described hereinbefore, wherein the pressure increasing rate is altered such that the pressure increasing rate increases in a stepwise manner after the condition is satisfied.

Advantageous Effects of the Invention

In accordance with the present invention, the brake fluid pressure control device includes the wheel speed obtaining device configured to obtain the wheel speed, and the vehicle body deceleration calculating means configured to calculate the vehicle body deceleration based on the wheel speed. If the condition is satisfied in which the vehicle body deceleration continues to stay at a low rate of less than or equal to the predetermined threshold value for the predetermined period of time, and the vehicle body deceleration is low, then the pressure increasing rate in the pressure increasing control is raised. Thus, it is possible to cause the brake fluid pressure of a brake caliper (CAL pressure) to quickly approach the fluid pressure of a master cylinder (M/C pressure).

Accordingly, it is possible to improve the brake responsiveness when the brake is re-operated by the driver during the ABS control, and reduce the driver's feeling of wrongness and strangeness.

In further accordance with the present invention, the pressure increasing control increases an amount of pressure increase of the brake fluid pressure by increasing time for opening the inlet n the master cylinder and the wheel brake, and reduces the holding time for holding the brake fluid pressure. Thus, it is possible to appropriately raise the pressure increasing rate, and improve the responsiveness.

In further accordance with the present invention, the predetermined threshold value is set based on the target vehicle body deceleration. Thus, it is possible to appropriately determine whether or not the deceleration similar to the target deceleration is experienced.

In further accordance with the present invention, the pressure increasing rate is altered such that the pressure increasing rate increases in a stepwise manner after the condition is satisfied. Thus, it is possible to appropriately raise the pressure increasing rate without giving the driver a feeling of wrongness and strangeness, and achieve a natural feeling.

BRIEF DESCRIPTION OF THE DRAWINGS

FIG. 5 depicts a correlation diagram between a target vehicle body speed and a predetermined period of time.

MODE FOR CARRYING OUT THE INVENTION

An embodiment of the present invention will be described below with reference to the accompanying drawings.

Embodiment(S)

Figure 1:
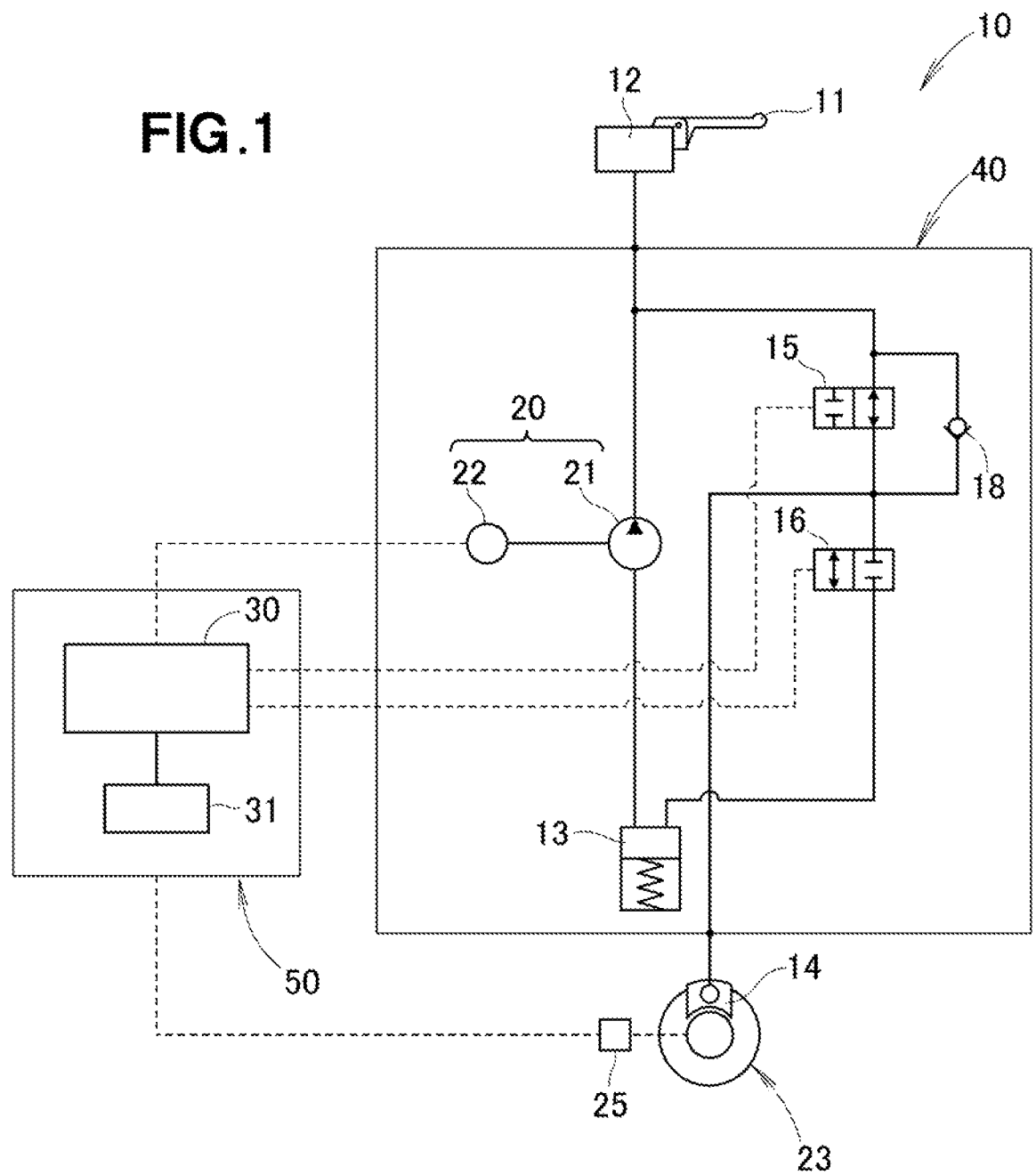
FIG. 1 is a fluid pressure circuit diagram of a brake fluid pressure control device for a vehicle, according to an embodiment of the present invention.

As shown in FIG. 1, a brake fluid pressure control device 10 for a vehicle is disposed on a bar handle vehicle, and applied to, for example, a front wheel of a two-wheel vehicle. The brake fluid pressure control device for a vehicle 10 is provided between a master cylinder 12 and a wheel brake 14, and includes, as its major elements, a fluid pressure unit 40 and a control device 50. Specifically, the brake fluid pressure control device for a vehicle 10 includes the master cylinder 12 to generate fluid pressure of a working fluid in response to manipulations of an operation part 11 of a brake lever, a reservoir 13 to temporarily reserve the working fluid, the inlet control valve 15 (control valve means 15) which is a normally open solenoid valve and disposed between the master cylinder 12 and the wheel brake 14, an outlet control valve 16 (control valve means 16) which is a normally closed solenoid valve and disposed between the master cylinder 12 and the wheel brake 14, and a check valve 18 arranged in parallel to the inlet control valve 15 to admit only the flow of the working fluid toward the master cylinder 12.

The brake fluid pressure control device for a vehicle 10 also includes a pump part 21 to pull the working fluid from the reservoir 13 and return it toward the master cylinder 12, an actuator 22 to drive (actuate) the pump part 21, a control device 30 to control the actuation of the actuator 22, and control opening and closing of the inlet control valve 15 and the outlet control valve 16, and a determination device 31 to determine whether a pressure increasing rate in the pressure increasing control should be raised or not.

A wheel speed sensor 25 to detect the wheel speed is disposed in the vicinity of the wheel 23. A detection signal of the wheel speed sensor 25 is transmitted to the determination device 31. The determination device 31 obtains the wheel speed, an estimated vehicle body speed and a vehicle body deceleration. A signal that represents the wheel speed, a signal that represents the estimated vehicle body speed, and a signal that represents the vehicle body deceleration are transmitted to the control device 30 from the determination device 31. The control device 30 performs ABS control and other processing, depending upon the pressure increasing rate. Therefore, it is possible to raise the pressure increasing rate in the pressure increasing control if the vehicle body deceleration is low.

Firstly, fundamental operations during normal braking and the ABS control will be described. The brake fluid pressure control device for a vehicle 10 has a function to switch between a normal state during the normal braking and states (reduced-pressure state, a holding state, and an increased-pressure state) during the ABS control.

During the normal braking: in the normal state, the master cylinder 12 communicates with the wheel brake 14 (the inlet control valve 15 is open), and the wheel brake 14 is disconnected from the reservoir 13 (the outlet control valve 16 is closed). As the operation part 11 is manipulated, the working fluid pressure is applied to the wheel brake 14 from the master cylinder 12 through the inlet control valve 15 to brake the wheel.

During the ABS control; the ABS control is carried out when the vehicle's wheel is about to lock. The control device switches among the reduced-pressure state, the holding state and the increased-pressure state.

In the reduced-pressure state of the ABS control, the master cylinder 12 is disconnected from the wheel brake 14 (the inlet control valve 15 is closed), and the wheel brake 14 communicates with the reservoir 13 (the outlet control valve 16 is open). The working fluid flowing to the wheel brake 14 is allowed to flow into the reservoir 13 through the outlet control valve 16, and therefore the working fluid pressure acting on the wheel brake 14 is reduced.

In the holding state of the ABS control, the master cylinder 12 is disconnected from the wheel brake 14, and the wheel brake 14 is disconnected from the reservoir 13 (the inlet control valve 15 and the outlet control valve 16 are closed). The pump 20 is deactivated, the working fluid is confined in the fluid passage closed by the wheel brake 14, the inlet control valve 15, the outlet control valve 16 and the pump 20, and the working fluid pressure acting on the wheel brake is maintained at a constant value.

In the increased-pressure state of the ABS control, the master cylinder 12 communicates with the wheel brake 14, and the wheel brake 14 is disconnected from the reservoir 13.

Now, the ABS pressure increasing control according to the embodiment of the present invention will be described in detail.

In the pressure increasing control, the control device 30 (brake fluid pressure control device for a vehicle 10) allows the master cylinder 12 to communicate with the wheel brake 14, and disconnects the wheel brake 14 from the reservoir 13. Specifically, the inlet control valve 15 is opened, and the outlet control valve 16 is closed. The pressure of the working fluid of the wheel brake 14 is increased by the fluid pressure generated by the master cylinder 12.

In this manner, the brake fluid pressure control device for a vehicle 10 can perform the fluid pressure control on the brake fluid pressure that acts on the wheel brake 14 by repeating the control cycle which includes at least the reduced-pressure state, the holding state and the increased-pressure state.

Now, the configuration of the determination device 31 will be described.

Figure 2:
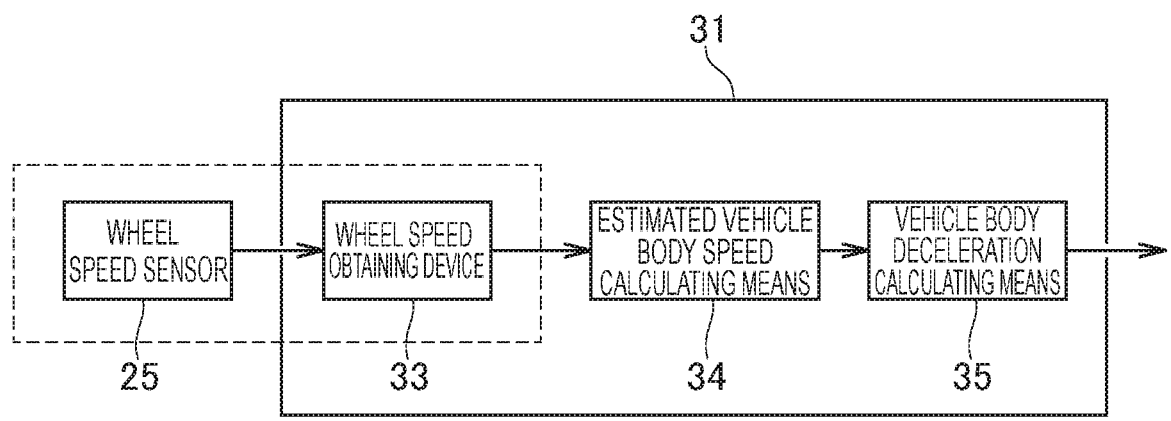
FIG. 2 is a block diagram showing a configuration of a determination device.

As illustrated in FIG. 2, a module for obtaining the wheel speed includes a wheel speed sensor 25 to detect the wheel speed, and a wheel speed obtaining device 33 to obtain the wheel speed detected by the wheel speed sensor 25.

The determination device 31 includes the wheel speed obtaining device 33, an estimated vehicle body speed calculating means 34 to calculate the estimated vehicle body speed on the basis of the wheel speed obtained by the wheel speed obtaining device 33, and a vehicle body deceleration calculating means 35 to calculate the vehicle body deceleration on the basis of the wheel speed. The vehicle body deceleration calculating means 35 generates a signal to raise the pressure increasing rate in the pressure increasing control if a condition is satisfied in which the vehicle body deceleration continues to stay at a low rate of less than or equal to a predetermined threshold value for a predetermined period of time and the vehicle body deceleration is low.

Now, a flowchart for changing the pressure increasing rate in the above-described brake fluid pressure control device for a vehicle will be described.

Figure 3:
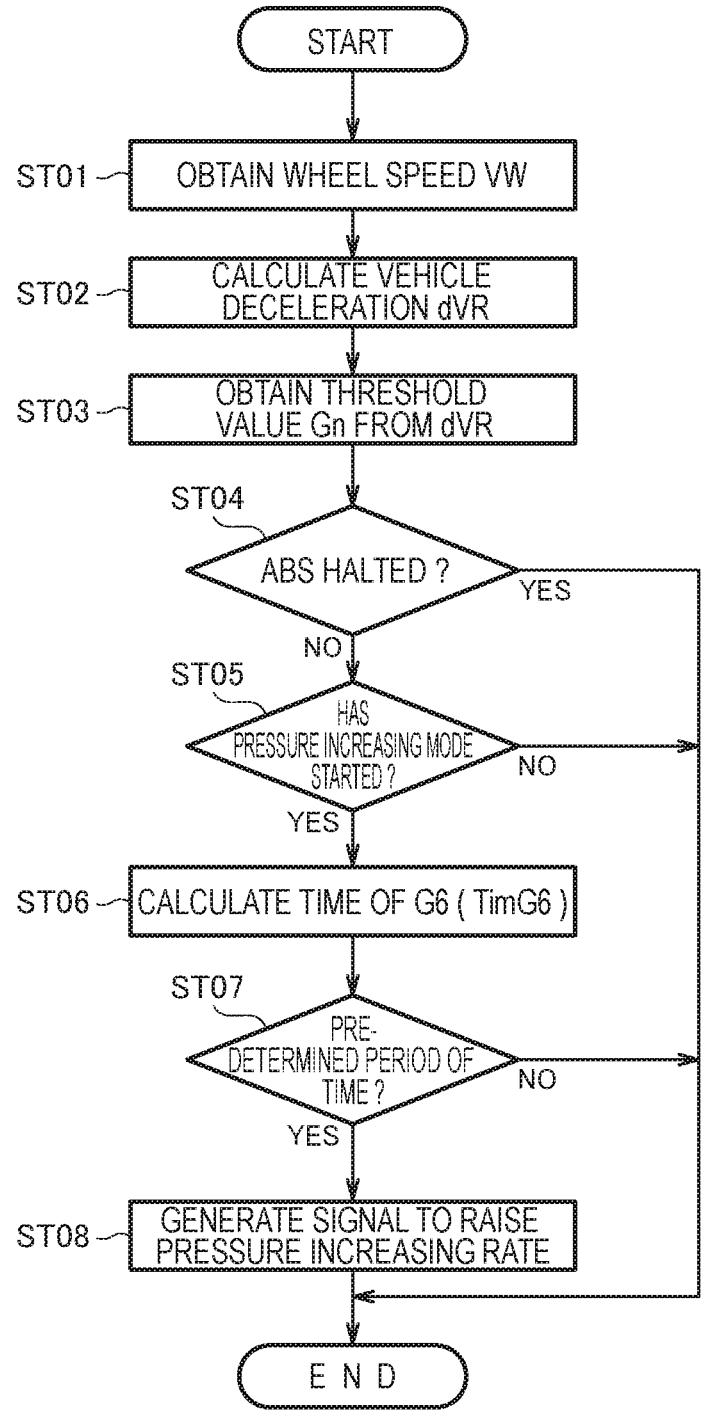
FIG. 3 is a control flowchart for raising a pressure increasing rate.

As shown in FIG. 3, during the ABS control, the wheel speed obtaining device 33 of the determination device 31 obtains the wheel speed VW using the signal from the wheel speed sensor 25 at Step 01 (Step is abbreviated to ST hereinafter).

At ST02, the vehicle body deceleration calculating means 35 calculates the vehicle body deceleration dVW on the basis of the wheel speed VW.

At ST03, the determination device obtains a deceleration region Gn from the vehicle body deceleration dVW.

At ST04, the determination device 31 determines whether the ABS control is halted. If the ABS control is not halted (ST04: NO), the processing goes to ST05. If the ABS control is halted (ST04: YES), the processing ends.

At ST05, the determination device 31 determines whether the pressure increasing mode has started. If the pressure increasing mode has started (ST05: YES), the processing goes to ST06. If the pressure increasing mode has not started (ST05: NO), the processing ends.

At ST06, the determination device 31 calculates the time of the deceleration region G6 during which the vehicle body deceleration is less than or equal to the predetermined threshold value, i.e., the time TimG6 of the deceleration region G6 in which the deceleration is the lowest.

At ST07, if the time TimG6 of the region G6 continues for a predetermined period of time tsn or longer (ST07: YES), the processing goes to ST08. If the time TimG6 of the region G6 continues less than the predetermined period of time tsn (ST07: NO), the processing ends. The predetermined period of time tsn is an arbitrary fixed value.

At ST08, the determination device 31 generates a signal to raise the pressure increasing rate. Then, the processing ends.

By performing the above-described control, it is possible to improve the responsiveness of the brake when the brake is re-operated by the driver during the ABS control, and reduce the driver's feeling of wrongness and strangeness.

Now, the pressure increasing control to raise the pressure increasing rate in the embodiment will be described. It should be noted that the time axes of FIG. 4B and FIG. 4C coincide with the time axis of FIG. 4A.

Figure 4A:
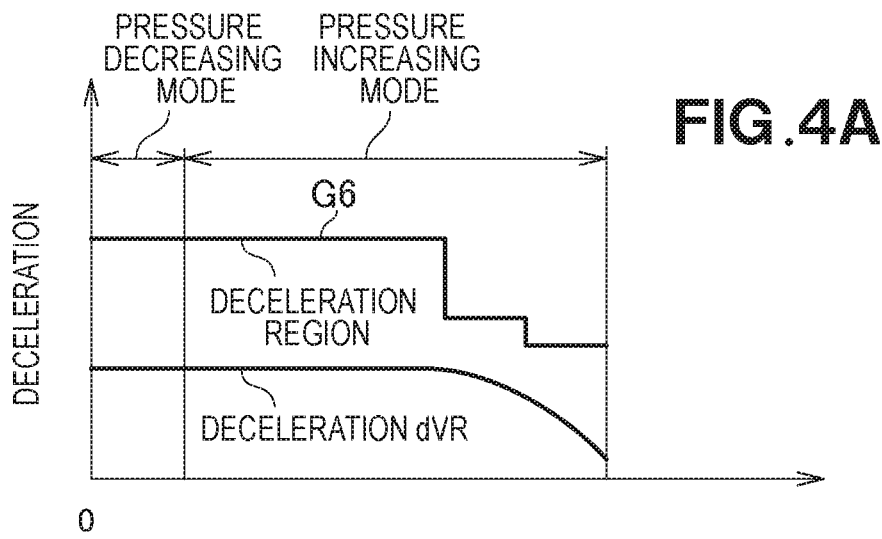
FIG. 4A depicts a correlation diagram between time and a deceleration in the embodiment.

FIG. 4A shows a correlation diagram between time and deceleration in the embodiment. After the pressure reducing mode, the operation shifts (proceeds) to the pressure increasing mode. For example, the deceleration region is divided into six steps (stages) G6-G1. The deceleration region G6 represents a region with the lowest deceleration, and the deceleration region G1 represents a region with the highest deceleration. The deceleration region changes from the deceleration region G6 to the deceleration region G5, and then to the deceleration region G4. The vehicle body deceleration dVR is substantially constant in the deceleration region G6. As the deceleration region shifts to the deceleration regions G5 and G4, the vehicle body deceleration dVR steeply changes.

Figure 4B:
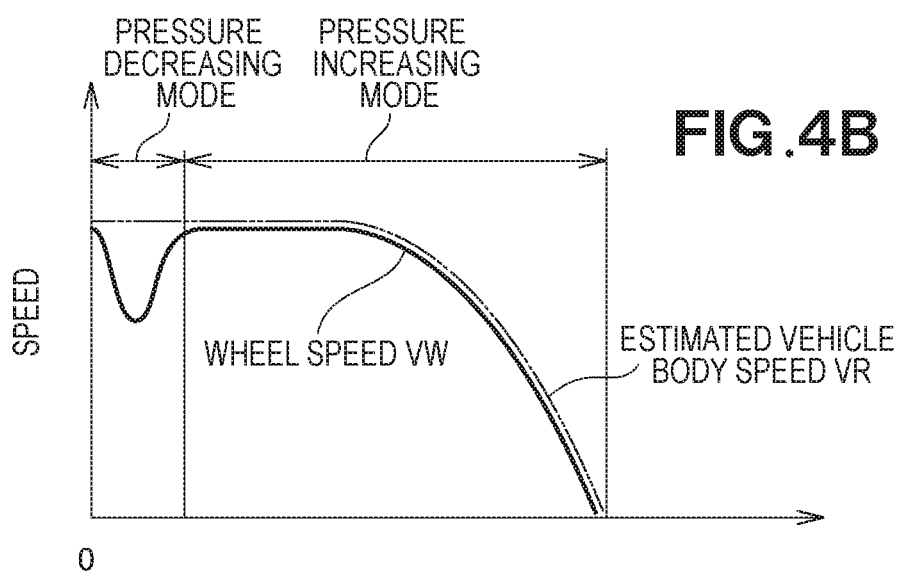
FIG. 4B depicts a correlation diagram between time and speed in the embodiment.

FIG. 4B shows a correlation diagram between time and speed in the embodiment. During the pressure increasing mode, the vehicle body speed VR decreases as the wheel speed VW decreases.

Figure 4C:
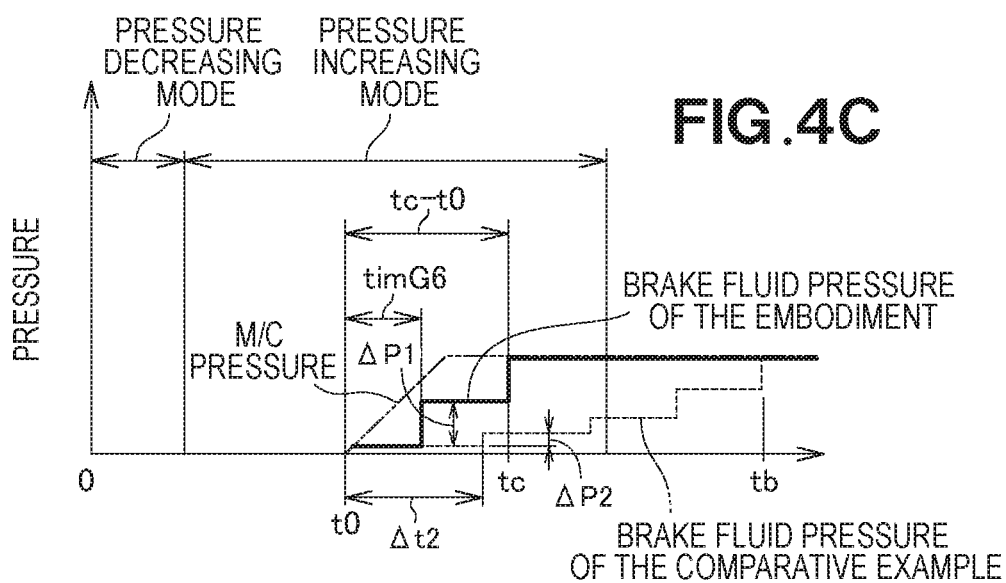
FIG. 4C depicts a correlation diagram between time and pressure in the embodiment.

FIG. 4C shows a correlation diagram between time, brake fluid pressure (CAL pressure) and master cylinder pressure (M/C pressure) in the embodiment. This is a situation in which the ABS control continues even if the driver stops the input manipulation to the brake operation part. When the driver re-operates the brake operation part during the pressure increasing mode, the master cylinder pressure increases, and subsequently becomes constant. With regard to the brake fluid pressure, on the other hand, the pressure increasing rate increases in a stepwise manner, but the holding time tact is relatively short in each step and an amount ΔP1 of pressure increase is large. Thus, the time (tc−t0) until the brake fluid pressure becomes equal to the master cylinder pressure becomes short.

As shown in FIG. 4C, if general pressure increasing control for increasing the pressure increasing rate is used as a comparative example, the pressure increasing rate increases in a stepwise manner for the brake fluid pressure in the comparative example, but the holding time Δt2 is long in each step and an amount ΔP2 of pressure increase is small. Thus, the time (tb−t0) until the brake fluid pressure becomes equal to the master cylinder pressure becomes relatively long. Consequently, the brake responsiveness deteriorates, and the driver has a feeling of wrongness and strangeness.

Therefore, when an amount of pressure increase of the brake fluid pressure is observed, ΔP2 is smaller than ΔP1 (ΔP2<ΔP1). Also, when the holding time of the brake fluid pressure is observed, Δt2 is smaller than tact (Δt2<tact). When the time until the brake fluid pressure becomes equal to the master cylinder pressure is observed, tc−t0 is smaller than tb−t0 (tc−t0<tb−t0). As such, the embodiment has a larger amount of pressure increase of the brake fluid pressure and the shorter holding time, compared to the general comparative example. Consequently, the time until the brake fluid pressure becomes equal to the master cylinder pressure becomes shorter.

In the embodiment, when the vehicle body deceleration dVR is low, it is possible to raise the pressure increasing rate in the pressure increasing control. Thus, it is possible to cause the brake fluid pressure of a brake caliper (CAL pressure) to quickly approach the fluid pressure of the master cylinder (M/C pressure). Accordingly, it is possible to improve the brake responsiveness when the brake is re-operated by the driver during the ABS control, and reduce the driver's feeling of wrongness and strangeness.

In the embodiment of the invention, an amount of pressure increase of the brake fluid pressure is increased and the holding time for holding the brake fluid pressure is reduced by increasing the time for opening the inlet control valve 15 disposed between the master cylinder 12 (see FIG. 1) and the wheel brake 14. Thus, it is possible to appropriately raise the pressure increasing rate, and improve the responsiveness. In addition, because the pressure increasing rate is altered to a higher value in a stepwise manner, it is possible to appropriately raise the pressure increasing rate without giving the driver a feeling of wrongness and strangeness, and achieve a natural feeling.

Next, the predetermined threshold value and the deceleration region Gn will be described.

As shown in FIG. 5, the deceleration region is G1 when the vehicle body deceleration is high. As the vehicle body deceleration becomes lower, the deceleration region changes to G2, G3, . . . , and G6. The predetermined threshold value is an arbitrary value, and the deceleration region G6 is a region in which the vehicle body deceleration is smaller than or equal to the predetermined threshold value.

It should be noted that although the embodiment has described an example in which the wheel brake fluid pressure control device is disposed only on the front wheel, the wheel brake fluid pressure control device may be disposed only on the rear wheel or both of the wheels.

It should be noted that although the control device 30 and the determination device 31 are provided separately in the embodiment, the control device and the determination device may be provided as a single element and their functions may be separated in the single element. It should also be noted that although the operation part 11 is the brake lever in the embodiment, the present invention is not limited to this; the operation part 11 may be a brake pedal. It should be noted that although the actuator 22 and the pump part 21 constitute, in combination, the pump 20 in the embodiment, the present invention is not limited to this; the actuator 22 may be a solenoid, and the pump 20 may a solenoid pump that includes a solenoid and the pump part 21. It should also be noted that the actuator 22 may be a motor.

It should be noted that although a module for obtaining the wheel speed includes a pulsar ring 24 and the wheel speed sensor 25, the present invention is not limited to this; the module for obtaining the wheel speed may use gears to detect the rotations of the wheel 23.

INDUSTRIAL APPLICABILITY

The present invention is advantageously applied to the brake fluid pressure control device mounted on the motorcycle.

REFERENCE NUMERALS

10: Brake fluid pressure control device for a vehicle
11: Operation part
12: Master cylinder (M/C)
14: Wheel brake
15: Inlet control valve
30: Control device
31: Determination device
33: Wheel speed obtaining device
35: Vehicle body deceleration calculating means
VW: Wheel speed
dVR: Vehicle body deceleration
Gn: Deceleration region
G6: Deceleration region in which the vehicle body deceleration is smaller than or equal to the predetermined threshold value
tsn: Predetermined time of period (holding time)
tact: Pressure increasing time

What is claimed is:

1. A brake fluid pressure control device for a vehicle, configured to be able to perform fluid pressure control for controlling brake fluid pressure acting on a wheel brake, comprising:
   a wheel speed obtaining device configured to obtain wheel speed; and
   a vehicle body deceleration calculating means configured to calculate a vehicle body deceleration based on the wheel speed,
   a determination device determining whether an ABS control is halted, wherein if a condition is satisfied in which the ABS control is not halted and the vehicle body deceleration continues to stay at a low rate of less than or equal to a predetermined threshold value for a predetermined period of time, said predetermined period of time being measured during a pressure increasing mode, a pressure increasing rate in pressure increasing control performed by the brake fluid pressure control device is altered to a higher value than before the condition is satisfied.

2. The brake fluid pressure control device for a vehicle according to claim 1, wherein the pressure increasing control performed by the brake fluid pressure control device is control that repeats increasing and holding of the brake fluid pressure, and
   the pressure increasing control increases an amount of pressure increase of the brake fluid pressure by increasing time for opening an inlet control valve disposed between a master cylinder and the wheel brake, and alters the pressure increasing rate to the higher value by reducing holding time for holding the brake fluid pressure.

3. The brake fluid pressure control device for a vehicle according to claim 1, wherein the predetermined threshold value is set based on a target vehicle body deceleration.

4. The brake fluid pressure control device for a vehicle according to claim 1, wherein the pressure increasing rate is altered such that the pressure increasing rate increases in a stepwise manner after the condition is satisfied.

\* \* \* \* \*